(12) United States Patent
Jungert et al.

(10) Patent No.: US 8,047,596 B2
(45) Date of Patent: Nov. 1, 2011

(54) ADJUSTABLE VEHICLE SEAT

(75) Inventors: Dieter Jungert, Weissach (DE); Tassilo Gilbert, Pforzheim (DE); Thomas Heger, Plochingen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 261 days.

(21) Appl. No.: 12/538,907

(22) Filed: Aug. 11, 2009

(65) Prior Publication Data

US 2010/0102586 A1 Apr. 29, 2010

(30) Foreign Application Priority Data

Oct. 28, 2008 (DE) .......................... 10 2008 053 476

(51) Int. Cl.
*B60N 2/16* (2006.01)
(52) U.S. Cl. ............... 296/65.09; 296/65.05; 296/65.13; 296/65.14
(58) Field of Classification Search .............. 296/65.05, 296/65.09, 65.13, 65.14; 297/337, 338, 340, 297/344.1
See application file for complete search history.

(56) References Cited

U.S. PATENT DOCUMENTS

| | | | | |
|---|---|---|---|---|
| 5,979,985 A * | 11/1999 | Bauer et al. | ..................... | 297/340 |
| 6,966,598 B2 * | 11/2005 | Schmale | ..................... | 296/65.08 |
| 7,216,915 B2 * | 5/2007 | Kammerer et al. | ........ | 296/65.09 |
| 7,300,107 B2 * | 11/2007 | Kammerer | ..................... | 297/336 |
| 7,578,537 B2 * | 8/2009 | Baetz et al. | ................ | 296/65.09 |
| 7,850,220 B2 * | 12/2010 | Holdampf | ................... | 296/65.13 |
| 7,891,737 B2 * | 2/2011 | Mather et al. | .................. | 297/334 |
| 2006/0061176 A1 * | 3/2006 | Sakai et al. | ............. | 297/344.15 |
| 2010/0102586 A1 * | 4/2010 | Jungert et al. | ............. | 296/65.05 |
| 2010/0102587 A1 * | 4/2010 | Jungert et al. | ............. | 296/65.08 |

FOREIGN PATENT DOCUMENTS

| | | |
|---|---|---|
| DE | 42 28 849 | 10/1993 |
| DE | 197 54 962 | 5/1999 |
| DE | 101 46 144 | 4/2003 |
| EP | 0 445 528 A2 | 9/1991 |
| EP | 0 594 526 A1 | 4/1994 |

* cited by examiner

*Primary Examiner* — Glenn Dayoan
*Assistant Examiner* — Gregory Blankenship
(74) *Attorney, Agent, or Firm* — Gerald E. Hespos; Michael J. Porco

(57) ABSTRACT

An adjustable vehicle seat (1) has an inclinable seat part (2). Front and rear bearings (7, 5) have upper ends pivotably connected to front and rear areas of the seat part (2) and having lower ends mounted pivotably in bearings (7, 5) in floor rails (10). The front bearings (7) have an adjustable length for changing an inclination of the seat part (2). First additional links (11) are mounted pivotably about a first axis (G2) in the seat part (2). Second additional links (12) have lower ends mounted pivotably in the rails (10) and upper parts connected pivotably to the first additional link (11) at a second axis (G6) spaced from the first axis (G2). An inclinable backrest (3) is mounted pivotably in the first additional link (11).

17 Claims, 1 Drawing Sheet

ADJUSTABLE VEHICLE SEAT

CROSS-REFERENCE TO RELATED APPLICATIONS

This application claims priority under 35 USC 119 to German Patent Application No. 10 2008 053 476.5 filed on Oct. 28, 2008, the entire disclosure of which is incorporated herein by reference.

BACKGROUND OF THE INVENTION

1. Field of the Invention

The invention relates to an adjustable vehicle seat.

2. Description of the Related Art

An adjustable vehicle seat, in particular a motor vehicle seat, has an inclinable seat part and an inclinable backrest mounted to the seat part. The seat part is mounted pivotably in bearings at the front and rear adjacent to remote sides of the seat part. The bearings are mounted pivotably in the vehicle floor or rails for longitudinally adjusting the vehicle seat. The front or rear bearings can be adjusted by adjusting means so that the spacing of the pivot axes of the respective bearing and the inclination of the seat part change.

Vehicle seats, such as those of passenger vehicles, have diverse adjustment options. For example, the height, longitudinal position, inclination and/or depth of the seat and the inclination of the backrest can be adjusted.

Vehicle seats with a "parallelogram-type height adjustment" can adjust the inclination and the height of the seat part at the same time by designing the bearings of the height adjustment means as links.

EP 0 445 528 A2 discloses an adjustable vehicle seat of the type mentioned above. The vehicle seat has a seat support with the function of the seat part described above. The seat part is mounted pivotably in the links. A posterior and thigh rest which is mounted pivotably in the seat supports adjacent to the backrest and is intended for the seat user. Toggle levers are mounted pivotably in the seat rails of the vehicle seat at positions in front of the seat supports, with respect to the customary direction of travel. The toggle levers are mounted at their ends facing away from the seat rails in a pivotable manner in the posterior and thigh rest in front of the seat supports. Thus an independent adjustment of the inclination of the posterior and thigh rest with respect to the seat supports. A backrest is mounted in the rear end of the seat supports in the region of the rear ends thereof. In this case, an articulated fitting for adjusting the angle of the backrest in relation to the seat supports can be provided.

The known vehicle seat disadvantageously has a structurally highly complicated design with the diverse links for adjusting the inclination of the seat supports and of the posterior and thigh rest. Furthermore, an adjustment of the inclination of the seat supports causes a corresponding adjustment of the inclination of the backrest, but no compensation for the adjustment of the backrest to the effect that the backrest has an unchanged inclination with respect to the floor of the vehicle so that the vehicle seat user can substantially retain the leaning inclination of his back when the position of the posterior and thigh rest changes.

Adjustable vehicle seats for motor vehicles also are known from EP 0 594 526 A1, DE 197 54 962 C1, DE 101 46 144 A1 and DE 42 28 849 C1.

It is an object of the present invention to develop a structurally and kinematically simple adjustable vehicle seat of the type mentioned above where an adjustment of the inclination of the seat part leaves the angle of inclination of the backrest relative to the vehicle floor substantially unchanged.

SUMMARY OF THE INVENTION

The invention relates to a vehicle seat that has an inclinable seat part and an inclinable backrest mounted to the seat part. The seat part is mounted pivotably in bearings at the front and rear adjacent to remote sides of the seat part. The bearings are mounted pivotably in the vehicle floor or rails for longitudinally adjusting the vehicle seat. The front or rear bearings can be adjusted by adjusting means so that the spacing of the pivot axes of the respective bearing and the inclination of the seat part change. The backrest is mounted to first additional links adjacent to the remote sides of the seat part. The respective first additional links are mounted pivotably in the seat part for pivoting about an axis. Second additional links are mounted in the floor or the rails. The first and the second additional links are connected pivotably to one another.

The vehicle seat also preferably comprises an actuating means for changing the inclination of the seat part. The angle of the backrest is independent of the angle of inclination of the seat part due to the mounting of the additional links in the seat part and in the floor or the rail. Thus, an increase in comfort can be obtained without decoupling the adjustment of the inclination of the seat part from the height adjustment thereof. A separate device for changing the inclination of the seat part therefore is not required. The angle of the backrest is decoupled from the seat part kinematics upon actuation of the adjusting means for the seat height or the seat inclination and the angle of the backrest is kept constant or executes a defined movement by means of the links, which define a 4-point kinematic joint.

The seat part preferably is a seat cushion of the vehicle.

In the context of the terminology of the present application, the term "seat cushion" of the vehicle seat is understood as meaning the entire seat unit mounted in the vehicle floor or in the rails for the longitudinal adjustment of the seat and serves to support the backrest. Accordingly, the adjustment of the seat cushion by means of the bearing elements leads directly to an adjustment of the posterior and thigh rest, which forms part of the seat cushion, for the person sitting on the vehicle seat. The seat cushion, therefore, generally has a seat support or a plurality of seat supports connected to the links. Furthermore, a cushion shell is held by the seat support or the seat supports and the posterior and thigh rest is held by the cushion shell. The mounting of the seat cushion in the bearings enables the seat cushion to be adjusted entirely within the context of an inclination upon activation of the adjusting means for the bearings. The bearings function exclusively to adjust the inclination and height of the seat cushion and therefore to adjust the posterior and thigh rest.

The vehicle seat of the subject invention does not require separate bearing elements for pivoting the posterior and thigh rest, which is mounted in the seat supports, and hence the subject invention contrasts to the adjustable driver's seat of EP 0 445 528 A2. Rather all of the bearing elements of the adjustable vehicle seat of the invention act exclusively on the seat cushion. The vehicle seat of the invention realizes the same adjustment option as in the seat of EP 0 445 528 A2, while saving on separate bearing elements for adjusting the posterior and thigh rest and with simplified kinematics.

The seat support, the cushion shell and the posterior and thigh rest preferably constitute a single unit. Thus, the diversity of parts in the vehicle seat can be reduced substantially.

The inclination of the seat part is changed by activating the adjusting means for the seat part. The additional links have the effect of compensating for the inclination of the backrest that arises when changing the inclination of the seat part. The backrest remains in a substantially unchanged position of inclination with respect to the floor of the vehicle due to this compensating adjustment of the inclination of the backrest. The inclination of the seat part relative to the floor is therefore changed, but the inclination of the backrest relative to the floor is not.

The adjusting means for adjusting the inclination of the seat part preferably is an electric adjusting means.

The adjustable vehicle seat is made structurally simple by having the front or rear bearings, and preferably the rear bearings, designed as links that cannot be changed in length. The height and inclination of the seat part is adjusted during pivoting of said links about their lower mounting on the floor or rail and about their upper mounting on the seat part. A mounting of the seat part then should be provided in the region of the other end of the seat part so that the spacing of the mounting of the seat part in the floor or the longitudinal rails can be changed. For example, the front or rear bearings, and preferably the front bearings, are designed as toggle levers. Each toggle lever has two rockers connected pivotably to each other. The one rocker is mounted pivotably in the seat part and the other rocker is mounted pivotably in the vehicle floor or the rail.

An alternative to the above-described construction is distinguished by a lever construction in which a rocker is pivoted by means of the associated adjusting means. More particularly, the front or rear bearings, and preferably the front bearings, are links that can be changed in length. A toggle lever arrangement therefore is not used in this case. The changeability of the lengths of the links can be brought about, for example, by means of electromotive adjusting means, in particular an electric spindle drive.

The additional links preferably are arranged so that the second additional link is substantially parallel to the rear bearing element. The first additional link preferably is substantially parallel to the floor or to the rail. A particularly precise compensation for the inclination of the backrest during a change in the inclination of the seat is ensured by the virtually parallelogram-type arrangement of the first and second additional links, the rear bearing elements and the floor/rail.

An object of the invention is enable a user to adjust the inclination of the backrest for maximum comfort. Accordingly, the lower end region of the backrest preferably is mounted in the first additional link so that the backrest can pivot about an axis and so that the backrest then can be fixed with respect to the axis after a desired inclination has been attained. The backrest could be connected fixedly to the first additional link. However, this construction would not permit the user to change the inclination of the backrest with respect to the first additional link and therefore the user of the seat would not be able to select an inclination of the backrest that is individually comfortable. The pivotable connection of the lower end region of the backrest to the first additional link enables the user to change the inclination of the backrest with respect to the first additional link and to select an inclination of the backrest that is individually comfortable for him or her. The backrest can be fixed releasably with respect to the first additional link when the desired inclined position of the backrest has been achieved. The pivotability of the backrest can take place manually or electromotively.

The backrest is preferably mounted in the first additional link between the axes of articulation of the first additional link, about which the second additional link and the rear bearing element can be pivoted.

Further advantages and features of the invention emerge from the description below of an exemplary embodiment of the invention without being restricted thereto.

DETAILED DESCRIPTION OF THE PREFERRED EMBODIMENT

Figure 1:
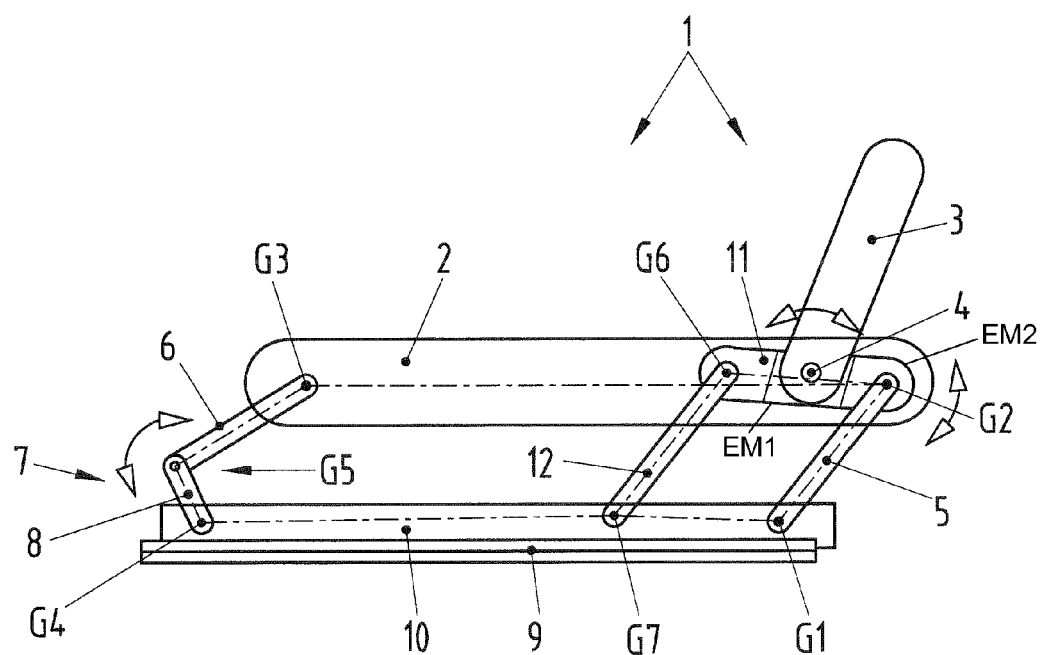
FIG. 1 shows a side schematic illustration of the adjustable vehicle seat according to the invention.

An adjustable vehicle seat in accordance with the invention is identified generally by the numeral 1 in FIG. 1. The adjustable vehicle seat 1 has a substantially horizontally arranged seat cushion 2 and backrest 3, which is reduced in size and therefore is not illustrated to scale. The seat cushion 2 includes a seat support, a cushion shell mounted in the seat support and a posterior and thigh rest held by the cushion shell. These components of the seat cushion 2 are not shown in FIG. 1. The backrest 3 is connected pivotably about an axis 4 that is arranged transversely with respect to the longitudinal extent of the vehicle. All of the pivot axes described herein are substantially parallel to the axis 4.

Left and right links 5 are mounted respectively in the left and right sides of the seat cushion 2 at positions behind the axis 4 so that each link 5 can pivot about the axis G2. Additionally, left and right rockers 6 of left and right toggle levers 7 are mounted in the seat cushion 2 at the front and can pivot about an axis G3. The relatively long rockers 6 are connected pivotably to relatively short rockers 8 of the toggle levers 7 at an axis G5. The lower ends of the rockers 8 are mounted pivotably about the axis G4 in longitudinal rails 10 mounted in the floor 9 of the motor vehicle. Correspondingly, the lower end of each link 5 is mounted in the longitudinal rail 10 to pivot about the axis G1. The link 5 is arranged at a steeper angle than the rocker 6, with the link 5 and the rocker 6 each being directed obliquely forward from their respective axes G2 and G3.

The backrest 3 is mounted in the region of the axis 4 in first additional links 11 on both sides of the seat cushion 2. The respective first additional link 11 is mounted in the seat cushion 2 to pivot about the axis G2 and is connected at its end facing away from the axis G2 to a second additional link 12 to pivot about an axis G6. The second additional link 12 is mounted in the longitudinal rail 10 to pivot about the axis G7. The rear link 5 and the second additional link 12 are approximately parallel. However, in this specific embodiment, the link 5 is at a somewhat steeper angle than the second additional link 12. The first additional link 11 is approximately parallel to the floor 9 or the longitudinal rail 10. However, in this specific embodiment, the front end of the first additional link 2 is inclined slightly up.

The backrest 3 could be connected fixedly to the additional links 12 arranged on both sides of the seat cushion 2. However, for comfort reasons, an adjusting means is provided for adjusting the inclination of the backrest 3 with respect to a line passing through the axes of articulation G2 and G6. The adjusting means includes, for example, an electric motor EM1 that enables the inclination of the backrest 3 to be adjusted independently of the compensation of the angle of inclination of the backrest 3 during the adjustment of the seat cushion 2.

The links 5 in the rear region of the seat cushion 2 are driven by adjusting means, preferably an electric motor M, that is mounted in the seat cushion 2 to adjust the inclination and height of the seat cushion 2. More particularly, the electric motor EM2 drives the axis/shaft G2, which is connected fixedly to the links 5. The driving force given to the axis/shaft G2 inclines the seat cushion 2 due to the connection of the seat cushion 2 via the links 5 and the toggle lever 7. The effect achieved by the kinematic arrangement of the link 5, the first additional link 12, the second additional link 13 and the rail 11 essentially corresponds to a parallelogram. More particularly, the backrest 3 substantially retains its angular position with respect to the floor or the longitudinal extent of the longitudinal rail 10 even though the inclination of the seat cushion 2 is adjusted.

What is claimed is:

1. An adjustable vehicle seat comprising:
    an inclinable seat part having front and rear ends;
    front and rear bearings each having an upper end pivotably connected to the front and rear ends of the seat part and lower ends pivotably mounted in a floor or rails, the front or rear bearings being adjustable for changing a spacing of pivot axes of the respective bearing and for changing an inclination of the seat part;
    at least one first additional link and mounted for pivoting about a first axis in the seat part;
    at least one second additional link having a lower end mounted pivotably in the floor or the rails and an upper part connected pivotably to the first additional link at a second axis spaced from the first axis; and
    an inclinable backrest mounted pivotably to the first additional link.

2. The vehicle seat of claim 1, wherein the seat part comprises a seat cushion of the vehicle seat.

3. The vehicle seat of claim 2, further comprising electric adjusting means for adjusting the inclination of the seat part.

4. The vehicle seat of claim 1, characterized in that the front bearings or the rear bearings are links that cannot be changed in length.

5. The vehicle seat of claim 1, wherein the front bearings or the rear bearings are toggle levers each of the toggle levers having first and second rockers connected pivotably to each other, the first rocker being mounted pivotably in the seat cushion and the second rocker being mounted pivotably in the vehicle floor or the rail.

6. The vehicle seat of claim 1, the front or rear bearings are links that can be changed in their length.

7. The vehicle seat of claim 6, further comprising electromotive adjusting means for adjusting the length of the respective link that can be changed in length.

8. The vehicle seat of claim 1, wherein the rear bearing and the second additional link are substantially parallel to each other.

9. The vehicle seat of claim 1, wherein the first additional link is substantially parallel to the floor or to the rail.

10. The vehicle seat of claim 1, wherein the backrest has lower end mounted in the first additional link in a manner such that the backrest can pivot about an axis and such that the backrest can be fixed with respect to said axis.

11. The vehicle seat of claim 10, further comprising adjusting means for adjusting the inclination of the backrest with respect to the first additional link.

12. The vehicle seat of claim 1, wherein the backrest is mounted in the first additional link between the first and second axes.

13. The vehicle seat of claim 2, characterized in that the seat cushion has a seat support, a cushion shell held by the seat support and a posterior and thigh rest held by the cushion shell.

14. The vehicle seat of claim 13, wherein the seat support, the cushion shell and the posterior and thigh rest constitute a single unit.

15. An adjustable vehicle seat comprising:
    an inclinable seat part having front and rear ends;
    front and rear bearings each having an upper end pivotably connected respectively to the front and rear ends of the seat part and lower ends pivotably mounted in a floor rail, the front bearing being adjustable for changing a spacing of pivot axes of the front bearing and for changing an inclination of the seat part;
    at least one first additional link and mounted for pivoting about a first axis in the seat part;
    at least one second additional link having a lower end mounted pivotably to the floor rail and an upper part connected pivotably to the first additional link at a second axis spaced from the first axis;
    an inclinable backrest having a lower end mounted pivotably to the first additional link at a position between the first and second axes in a manner so that the backrest can pivot about an axis and such that the backrest can be fixed with respect to said axis:
    adjusting means for adjusting the inclination of the backrest with respect to the first additional link.

16. The vehicle seat of claim 15, further comprising electromotive adjusting means for adjusting the length of the front bearings.

17. The vehicle seat of claim 16, wherein the front bearings are a toggle lever, each of the toggle levers having first and second rockers connected pivotably to each other, the first rocker being mounted pivotably in the seat cushion and the second rocker being mounted pivotably in the floor rail.

* * * * *